United States Patent
Wang et al.

(10) Patent No.: US 10,410,602 B2
(45) Date of Patent: Sep. 10, 2019

(54) DISPLAY DEVICE AND METHOD OF DRIVING DISPLAY PANEL (71) Applicant: BOE TECHNOLOGY GROUP CO., LTD., Beijing (CN)

(72) Inventors: Wenbo Wang, Beijing (CN); Chienpang Huang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 70 days.

(21) Appl. No.: 15/552,557

(22) PCT Filed: Feb. 20, 2017

(86) PCT No.: PCT/CN2017/074094
§ 371 (c)(1),
(2) Date: Aug. 22, 2017

(87) PCT Pub. No.: WO2018/032740
PCT Pub. Date: Feb. 22, 2018

(65) Prior Publication Data
US 2018/0336864 A1  Nov. 22, 2018

(30) Foreign Application Priority Data
Aug. 19, 2016  (CN) .......................... 2016 1 0689429

(51) Int. Cl.
G09G 5/02  (2006.01)
G09G 3/00  (2006.01)
G09G 5/00  (2006.01)

(52) U.S. Cl.
CPC ................. G09G 5/02 (2013.01); G09G 3/00 (2013.01); G09G 5/006 (2013.01);
(Continued)

(58) Field of Classification Search
CPC ............ G09G 5/02; G09G 5/006; G09G 3/00; G09G 2320/0233; G09G 2300/0452; G09G 2310/0291; G02F 1/133
See application file for complete search history.

(56) References Cited

U.S. PATENT DOCUMENTS 10,142,563 B2 * 11/2018 Shionoya ............ H04N 5/35554
2006/0022968 A1 * 2/2006 Kondo .................. G09G 3/3208
345/211

(Continued)

FOREIGN PATENT DOCUMENTS

CN  101996600 A  3/2011
CN  101996601 A  3/2011
(Continued)

OTHER PUBLICATIONS

Search Report for International Application No. PCT/CN20171074094 dated May 16, 2017.

Primary Examiner — Ibrahim A Khan
(74) Attorney, Agent, or Firm — Calfee, Halter & Griswold LLP (57) ABSTRACT Disclosed is a display device. A display area includes a first region and a second region having a boundary therebetween, with a boundary region defined around the boundary. Conversions of raw pixel data for respective regions having a format suitable for a second sub-pixel arrangement into converted pixel data having a format suitable for a first sub-pixel arrangement are based on the raw pixel data for the respective regions and additionally on the pixel data corresponding to the boundary region. Also disclosed is a method of driving a display panel.

16 Claims, 5 Drawing Sheets (52) U.S. Cl.
CPC .............. *G09G 2300/0452* (2013.01); *G09G 2310/0291* (2013.01); *G09G 2320/0233* (2013.01)

(56) References Cited

U.S. PATENT DOCUMENTS

| | | | |
|---|---|---|---|
| 2008/0186325 A1* | 8/2008 | Higgins | G09G 3/2003 345/592 |
| 2010/0118045 A1* | 5/2010 | Brown Elliott | G02B 27/2214 345/589 |
| 2011/0043533 A1* | 2/2011 | Han | G09G 5/02 345/589 |
| 2011/0043552 A1* | 2/2011 | Brown Elliott | G09G 3/3406 345/694 |
| 2011/0043553 A1 | 2/2011 | Brown et al. | |
| 2011/0109658 A1* | 5/2011 | Park | G09G 3/3406 345/690 |
| 2012/0075334 A1* | 3/2012 | Pourbigharaz | G06F 3/1438 345/619 |
| 2013/0082901 A1* | 4/2013 | Watanabe | G02F 1/13336 345/1.3 |
| 2015/0039967 A1 | 2/2015 | Romanovskyy | |
| 2015/0339967 A1* | 11/2015 | Shin | G06F 3/1446 345/690 |
| 2015/0363912 A1* | 12/2015 | Elliott | G06T 3/4015 348/277 |
| 2015/0363944 A1* | 12/2015 | Elliott | G06T 3/4015 345/589 |

FOREIGN PATENT DOCUMENTS

| | | |
|---|---|---|
| CN | 104821147 A | 8/2015 |
| CN | 105261321 A | 1/2016 |

* cited by examiner (PRIOR ART)

DISPLAY DEVICE AND METHOD OF DRIVING DISPLAY PANEL

CROSS-REFERENCE TO RELATED APPLICATIONS

The present application is the U.S. national phase entry of PCT/CN2017/074094, with an international filing date of Feb. 20, 2017, which claims the benefit of Chinese Patent Application No. 201610689429.5, filed on Aug. 19, 2016, the entire disclosures of which are incorporated herein by reference.

TECHNICAL FIELD

The present disclosure relates to the field of display technology, and particularly to a display device and a method of driving a display panel.

BACKGROUND

Subpixel Rendering (SPR) technology has been widely used. As compared to the Real RGB subpixel arrangement, the SPR subpixel arrangement can increase the number of pixels per inch (PPI) and reduce the number of channels of a driver integrated circuit (IC).

In applications of medium and large size screens, there has been proposed a scheme where a display panel is divided into two or more display areas that are driven by respective driver ICs. In this scheme, one frame of raw image data (which typically has a Real RGB format) from a system interface is divided into two or more portions and sent to the respective driver ICs, respectively. For display panels using an SPR sub-pixel arrangement, it is necessary to convert the raw image data into image data suitable for the SPR sub-pixel arrangement. Such a conversion however often results in display defects (e.g., dark lines or bright lines) near the boundary between the display areas. This is because the driver ICs lack adjacent image data from the other side of the boundary when converting the image data at one side of the boundary, resulting in erroneous conversion.

SUMMARY

It would be advantageous to achieve a mechanism which may alleviate, mitigate or even eliminate display defects at a boundary between display areas due to lack of data for neighboring pixels in pixel format conversion.

According to a first aspect of the present disclosure, a display device is provided which comprises a display panel comprising a display area having a sub-pixel array subject to a first sub-pixel arrangement, the display area comprising a first region and a second region arranged side by side in a row direction of the sub-pixel array. The display device further comprises a first driving circuit configured to receive raw pixel data for the first region having a format suitable for a second sub-pixel arrangement and to convert the raw pixel data into converted pixel data having a format suitable for the first sub-pixel arrangement. The display device further comprises a second driving circuit configured to receive raw pixel data for the second region having a format suitable for the second sub-pixel arrangement and to convert the raw pixel data into converted pixel data having a format suitable for the first sub-pixel arrangement. The first region and the second region have a boundary therebetween, a boundary region being defined around the boundary. The conversion by the first driving circuit is based on the raw pixel data for the first region and additionally on the pixel data corresponding to the boundary region. The conversion by the second driving circuit is based on the raw pixel data for the second region and additionally on the pixel data corresponding to the boundary region.

In certain exemplary embodiments, the first driving circuit comprises a first interface for receiving the raw pixel data for the first region; a first buffer configured to buffer a portion of the raw pixel data for the first region that corresponds to the boundary region in response to the first interface receiving the raw pixel data for the first region; and a first pixel format converter configured to perform the conversion of the raw pixel data for the first region. The second driving circuit comprises a second interface for receiving the raw pixel data for the second region; a second buffer configured to buffer a portion of the raw pixel data for the second region that corresponds to the boundary region in response to the second interface receiving the raw pixel data for the second region; and a second pixel format converter configured to perform the conversion of the raw pixel data for the second region.

In certain exemplary embodiments, the first pixel format converter is configured to perform the conversion based on the raw pixel data for the first region received by the first interface and additionally on the portion of data buffered by the first buffer, and the second pixel format converter is configured to perform the conversion based on the raw pixel data for the second region received by the second interface and additionally on the portion of data buffered by the second buffer.

In certain exemplary embodiments, the first buffer and the second buffer are configured to swap their respective buffered portions of data with each other such that the first pixel format converter and the second pixel format converter perform the conversion based on the respective raw pixel data and additionally on the respective swapped portions of data.

In certain exemplary embodiments, the first driving circuit further comprises a third buffer configured to receive and buffer the buffered portion of data from the second buffer such that the first pixel format converter performs the conversion based on the raw pixel data for the first region received by the first interface and additionally on the portion of data buffered by the third buffer. The second driving circuit further comprises a fourth buffer configured to receive and buffer the buffered portion of data from the first buffer such that the second pixel format converter performs the conversion based on the raw pixel data for the second region received by the second interface and additionally on the portion of data buffered by the fourth buffer.

In certain exemplary embodiments, the first pixel format converter and the second pixel format converter are configured to perform the conversion on a basis of per raw pixel data row. The first buffer is configured to buffer data for one or more pixels closest to the boundary in a row of raw pixel data for the first region in response to the first interface receiving the row of raw pixel data for the first region. The second buffer is configured to buffer data for one or more pixels closest to the boundary in a row of raw pixel data for the second region in response to the second interface receiving the row of raw pixel data for the second region.

In certain exemplary embodiments, the first sub-pixel arrangement is a sub-pixel rendering arrangement, and the second sub-pixel arrangement is a Real RGB arrangement.

According to another aspect of the present disclosure, a method of driving a display panel is provided. The display panel comprises a display area having a sub-pixel array subject to a first sub-pixel arrangement, the display area comprises a first region and a second region arranged side by side in a row direction of the sub-pixel array, and the first region and the second region have a boundary therebetween, with a boundary region being defined around the boundary. The method comprising steps of: receiving, by a first driving circuit and a second driving circuit, raw pixel data for the first region having a format suitable for a second sub-pixel arrangement and raw pixel data for the second region having a format suitable for the second sub-pixel arrangement, respectively; converting, by the first driving circuit, the raw pixel data for the first region into converted pixel data having a format suitable for the first sub-pixel arrangement, wherein the conversion is based on the raw pixel data for the first region and additionally on the pixel data corresponding to the boundary region; and converting, by the second driving circuit, the raw pixel data for the second region into converted pixel data having a format suitable for the first subpixel arrangement, wherein the conversion is based on the raw pixel data for the second region and additionally on the pixel data corresponding to the boundary region.

These and other aspects of the present disclosure will be apparent from and elucidated with reference to the embodiment(s) described hereinafter.

BRIEF DESCRIPTION OF THE DRAWINGS

Further details, features and advantages of the disclosure are disclosed in the following description of exemplary embodiments in connection with the accompanying drawings, in which.

DETAILED DESCRIPTION

The disclosure will now be described more fully hereinafter with reference to the accompanying drawings, in which exemplary embodiments of the disclosure are shown. The present disclosure may, however, be embodied in many different forms and should not be construed as being limited to the embodiments set forth herein. Rather, these embodiments are provided such that this disclosure will be thorough and complete, and will fully convey the scope of the disclosure to those skilled in the art. Like reference numerals refer to like elements throughout.

Figure 1A:
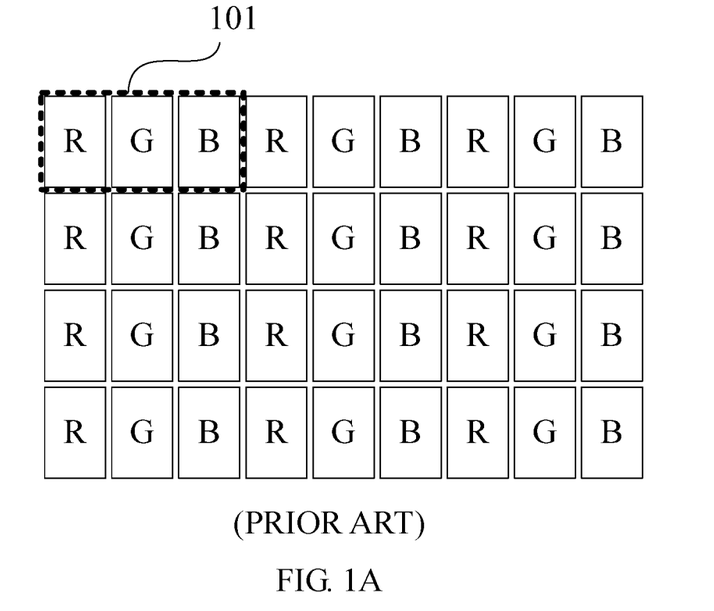
FIG. 1A is a schematic diagram of a Real RGB sub-pixel arrangement.

FIG. 1A is a schematic diagram of a Real RGB sub-pixel arrangement. In this arrangement, each pixel 101 is composed of three sub-pixels R, G and B, and the pixels 101 occur repeatedly.

Figure 1B:
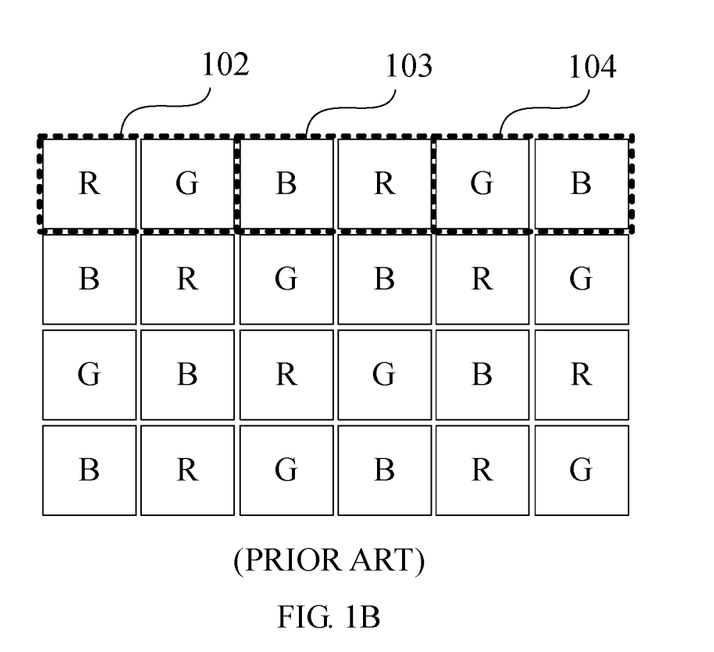
FIG. 1B is a schematic diagram of a typical SPR arrangement.

FIG. 1B is a schematic diagram of a typical SPR arrangement. In this arrangement, each pixel consists of two sub-pixels. For example, a pixel 102 is composed of sub-pixels R and a pixel 103 is composed of sub-pixels B and R, and a pixel 104 is composed of sub-pixels G and B. The pixels 102, 103 and 104 are periodically arranged in a certain order, with adjacent pixels being associated with each other.

Figure 2A:
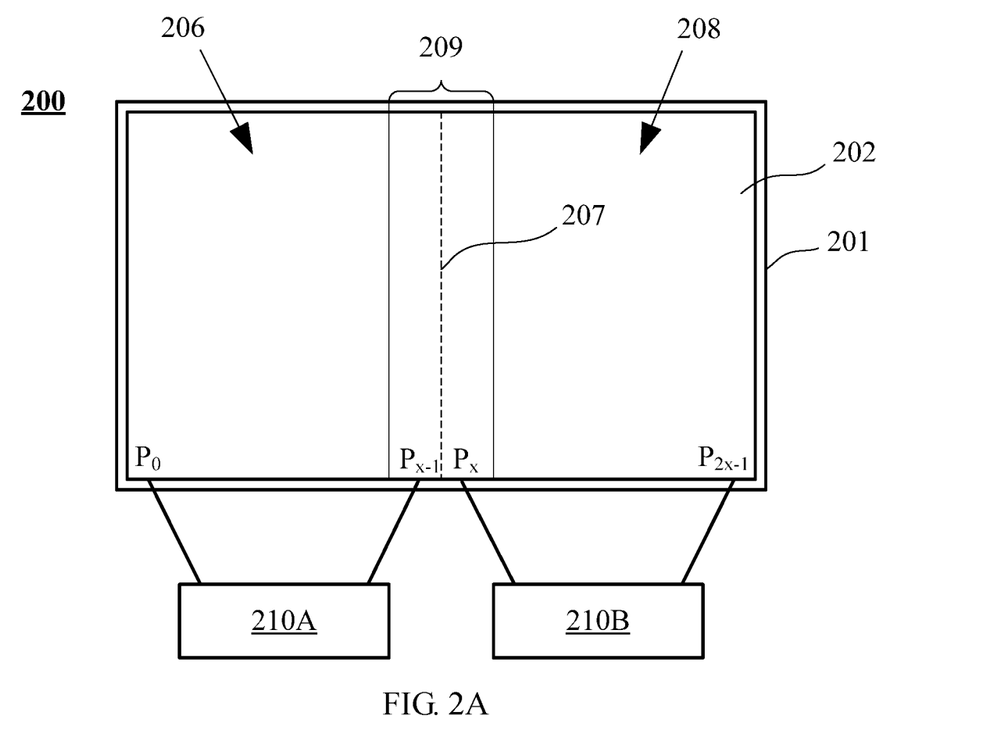
FIG. 2A is a high level block diagram of a display device according to an embodiment of the present disclosure.

FIG. 2A is a high level block diagram of a display device 200 according to an embodiment of the present disclosure.

Referring to FIG. 2A, the display device 200 includes a display panel 201, a first driving circuit 210A, and a second driving circuit 210B.

The display panel 201 includes a display area 202 having a sub-pixel array (not shown) that is subject to a first sub-pixel arrangement (e.g., an SPR arrangement). The display area 202 includes a first region 206 and a second region 208 that are arranged side by side in a row direction of the sub-pixel array.

The first driving circuit 210A is configured to receive raw pixel data for the first region 206 having a format suitable for a second sub-pixel arrangement (e.g., a Real RGB arrangement) and to convert the raw pixel data into converted pixel data having a format suitable for the first sub-pixel arrangement.

The second driving circuit 210B is configured to receive raw pixel data for the second region 208 having a format suitable for the second sub-pixel arrangement and to convert the raw pixel data into converted pixel data having a format suitable for the first sub-pixel arrangement.

It will be appreciated that the conversion of the pixel format from e.g. Real RGB to SPR is known per se, where the pixel value of one SPR pixel may originate from the pixel values of several neighboring Real RGB pixels. Various aspects of the present disclosure do not involve specific algorithms for pixel format conversion, but rather discuss how to prepare pixel data needed by the pixel format conversion for pixels in the vicinity of the boundary between display areas in a case where the pixel data is separately supplied to different display areas.

As shown in FIG. 2A, the first region 206 and the second region 208 have a boundary 207 therebetween, with a boundary region 209 being defined around the boundary 207. The size (more specifically, width) of the boundary region 209 is dependent on the number of raw pixel data that the first driving circuit 210A and the second driving circuit 210B need to "borrow" when performing the pixel format conversion. In the example of FIG. 2A, the boundary region 209 has a width corresponding to two raw pixel data such that the raw pixel data $P_{x-1}$ and $P_x$ at both sides of the boundary 207 fall within the boundary region 209 where x is the number of the pixel data contained in a row of raw pixel data in the first region 206 or the second region 208.

In the following embodiments, it is assumed that the pixel format conversion is performed on a basis of per raw pixel data row, and that the boundary region 209 includes two raw pixel data $P_{x-1}$ and $P_x$. In this case, the conversion by the first driving circuit 210A is based on a row of raw pixel data $P_0$ to $P_{x-1}$ for the first region 206 and additionally on the pixel data $P_{x-1}$ and $P_x$ corresponding to the boundary region 209, and the conversion by the second driving circuit 210B is based on a row of raw pixel data $P_x$ to $P_{2x-1}$ for the second region 208 and additionally on the pixel data $P_{x-1}$ and $P_x$ corresponding to the boundary region 209.

Figure 2B:
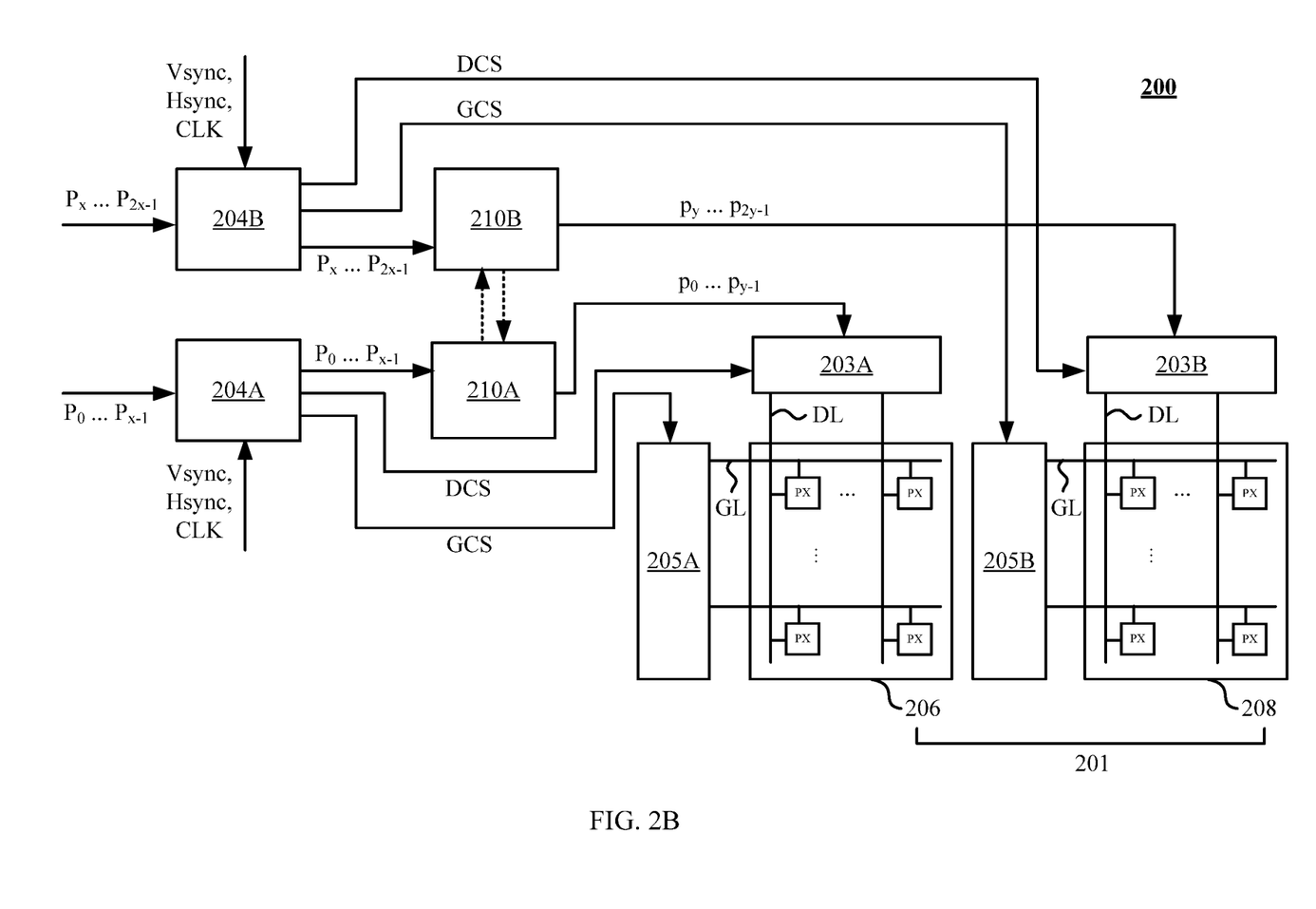
FIG. 2B is a more detailed block diagram of the display device of FIG. 2A.

FIG. 2B is a more detailed block diagram of the display device 200 of FIG. 2A.

Referring to FIG. 2B, the display device 200 includes a display panel 201 including a first display area 206 and a second display area 208, in which data lines DL and gate lines GL intersect each other and sub-pixels PX are formed at the intersections. The sub-pixels PX are distributed in the display areas 206 and 208 in a first sub-pixel arrangement (e.g., an SPR arrangement).

In this example, the display device 200 further includes a first driving circuit 210A for converting the raw pixel data $P_0$ to $P_{x-1}$ into pixel data $p_0$ to $p_{y-1}$ suitable for the sub-pixel arrangement of the display panel 201, a second driver circuit 210B for converting the raw pixel data $P_x$ to $P_{2x-1}$ into pixel data $p_y$ to $p_{2y-1}$ suitable for the sub-pixel arrangement of the display panel 201, a data driver 203A for supplying the converted pixel data $p_0$ to $p_{y-1}$ to the data lines DL of the display region 206, a data driver 203B for supplying the converted pixel data $p_y$ to $p_{2y-1}$ to the data lines DL of the second display region 208, a gate driver 205A for sequentially supplying a gate scan pulse to the gate lines GL of the first display region 206, a gate driver 205B for sequentially supplying a gate scan pulse to the gate lines GL of the second display region 208, a timing controller 204A for controlling the drivers 203A and 205A, and a timing controller 204B for controlling the drivers 203B and 205B.

The timing controllers 204A and 204B receive the raw pixel data $P_0$ to $P_{x-1}$ and $P_x$ to $P_{2x-1}$ from a system interface, and generate control signals GCS for controlling the gate drivers 205A and 205B and data control signals DCS for controlling the data drivers 203A and 203B using a vertical synchronization signal Vsync, a horizontal synchronization signal Hsync, and a clock signal CLK.

The data drivers 203A and 203B convert the pixel data $p_0$ to $p_{y-1}$ and $p_y$ to $p_{2y-1}$ into analog gray-scale voltages and supply the analog gray-scale voltages to the data lines DL.

The gate drivers 205A and 205B sequentially supply the gate scan pulse to the gate lines GL for selecting the gate lines to be supplied with the analog gray scale voltages.

It will be appreciated that in certain exemplary embodiments the first driving circuit 210A, the timing controller 204A, the data driver 203A and the gate driver 205A may be integrated into a single chip, and that the second driver circuit 210B, the timing controller 204B, the data driver 203B and the gate driver 205B may be integrated into a single chip. The first driver circuit 210A and the second driver circuit 210B may also be implemented with an application specific integrated circuit, a field programmable gate array (FPGA), a digital signal processor (DSP), or even a general purpose processor.

Figure 3:
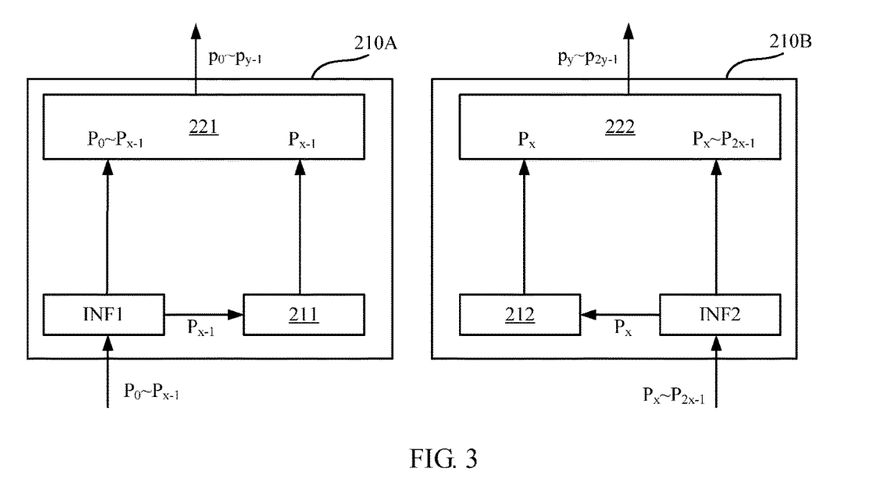
FIG. 3 is a block diagram of an embodiment of the first and second driving circuits of FIG. 2A.

FIG. 3 is a block diagram of an embodiment of the first driving circuit 210A and the second driving circuit 210B in FIG. 2A.

The first driving circuit 210A buffers a portion $P_{x-1}$ of the raw pixel data $P_0$ to $P_{x-1}$ for the first region 206 that corresponds to the boundary region 209 in response to reception of the raw pixel data $P_0$ to $P_{x-1}$. The second driving circuit 210B buffers a portion $P_x$ of the raw pixel data $P_x$ to $P_{2x-1}$ for the second region 208 that corresponds to the boundary region 209 in response to reception of the raw pixel data $P_x$ to $P_{2x-1}$.

Referring to FIG. 3, the first driving circuit 210A includes a first interface INF1, a first buffer 211, and a first pixel format converter 221. The first interface INF1 receives the raw pixel data $P_0$ to $P_{x-1}$ for the first region 206. The first buffer 211 is configured to buffer the portion $P_{x-1}$ of the raw pixel data $P_0$ to $P_{x-1}$ for the first region 206 that corresponds to the boundary region 209 in response to the first interface INF1 receiving the raw pixel data $P_0$ to $P_{x-1}$. The first pixel format converter 221 is configured to perform the conversion of the raw pixel data $P_0$ to $P_{x-1}$ for the first region 206.

The second driving circuit 210B includes a second interface INF2, a second buffer 212, and a second pixel format converter 222. The second interface INF2 receives the raw pixel data $P_x$ to $P_{2x-1}$ for the second region 208. The second buffer 212 is configured to buffer the portion $P_x$ of the raw pixel data $P_x$ to $P_{2x-1}$ for the second region 208 that corresponds to the boundary region 209 in response to the second interface INF2 receiving the raw pixel data $P_x$ to $P_{2x-1}$. The second pixel format converter 222 is configured to perform the conversion of the raw pixel data $P_x$ to $P_{2x-1}$ for the second region 208.

In the example of FIG. 3, the first driving circuit 210A and the second driving circuit 210B do not swap the pixel data with each other, but "borrow" their own pixel data located at the boundary region 209 and regard it as the pixel data at the opposite side of the boundary 207. This is based on the estimation that the pixel value of a pixel at one side of the boundary 207 is equal to the pixel value of a pixel at the other side of the boundary 207. Therefore, the pixel data $P_{x-1}$ buffered by the first buffer 211 is regarded as an estimation of the pixel data $P_x$, and the pixel data $P_x$ buffered by the second buffer 212 is regarded as an estimation of the pixel data $P_{x-1}$.

The first pixel format converter 221 is configured to perform the conversion based on the raw pixel data $P_0$ to $P_{x-1}$ for the first region 206 received by the first interface INF1 and additionally on the portion of data $P_{x-1}$ buffered by the first buffer 211, and the second pixel format converter 222 is configured to perform the conversion based on the raw pixel data $P_x$ to $P_{2x-1}$ for the second region 208 received by the second interface INF2 and additionally on the portion of data $P_x$ buffered by the second buffer 212. In other words, the conversion of the raw pixel data $P_0$ to $P_{x-1}$ for the first region 206 is based on the raw pixel data $P_0$ to $P_{x-1}$ for the first region 206 and additionally on the portion $P_{x-1}$ of the raw pixel data for the first region 206 that corresponds to the boundary region 209, and the conversion of the raw pixel data $P_x$ to $P_{2x-1}$ for the second region 208 is based on the raw pixel data $P_x$ to $P_{2x-1}$ for the second region 208 and additionally on the portion $P_x$ of the raw pixel data $P_x$ to $P_{2x-1}$ for the second region 208 that corresponds to the boundary region 209.

There is no need to provide a data transmission channel between the first driving circuit 210A and the second driving circuit 210B since they do not swap data with each other. This may simplify the design of the driving circuits.

Alternatively, the first driving circuit 210A and the second driving circuit 210B swap their respective buffered pixel data before the conversions by the first driving circuit 210A and the second driving circuit 210B. In certain exemplary embodiments, the swapping may be performed in a horizontal blanking interval in which the pixel data is actually not displayed. Other embodiments are possible. For example, where appropriate, the swapping may even be performed in a horizontal active interval between horizontal blanking intervals.

Figure 4:
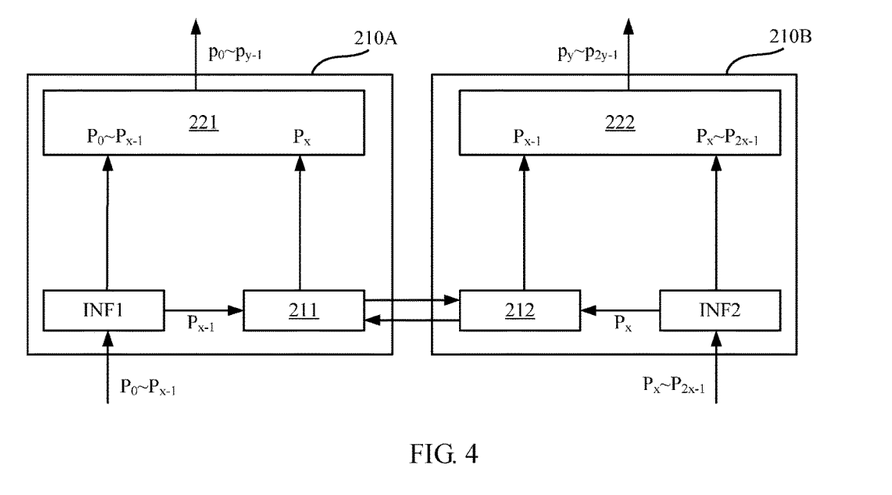
FIG. 4 is a block diagram of another embodiment of the first and second driving circuits of FIG. 2A.

FIG. 4 is a block diagram of another embodiment of the first driving circuit 210A and the second driving circuit 210B in FIG. 2A.

Referring to FIG. 4, the first buffer 211 and the second buffer 212 are configured to swap their respective buffered pixel data with each other such that the first pixel format converter 221 and the second pixel format converter 222 perform the conversions based on their respective raw pixel data and additionally on the respective swapped pixel data. Specifically, the first pixel format converter 221 performs the conversion based on the raw pixel data $P_0$ to $P_{x-1}$ for the first region 206 received by the first interface INF1 and additionally on the swapped pixel data $P_x$ from the first buffer 211, and the second pixel format converter 222 performs the conversion based on the raw pixel data $P_x$ to $P_{2x-1}$ for the second region 208 received by the second interface INF2 and additionally on the swapped pixel data $P_{x-1}$ from the second buffer 212.

The first buffer 211 and the second buffer 212 generally do not swap their data in a "full duplex" manner. In an embodiment, after the pixel data $P_{x-1}$ sent from the first buffer 211 to the second buffer 212 is fed into the second pixel format converter 222, buffering of the pixel data $P_x$ at the second buffer 212 and transmission to the first buffer 211 are started. This requires strict timing control. However, this may provide a more accurate conversion as compared to the embodiment of FIG. 3 since the first pixel format converter 221 and the second pixel format converter 222 are now provided with actual pixel data at the opposite side of the boundary, rather than an estimation thereof.

Figure 5:
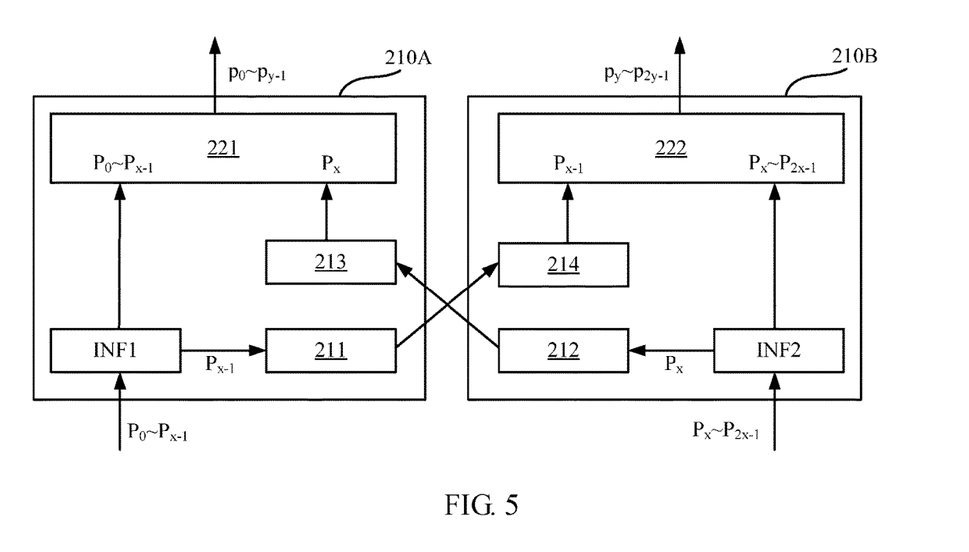
FIG. 5 is a block diagram of yet another embodiment of the first and second driving circuits of FIG. 2A.

FIG. 5 is a block diagram of yet another embodiment of the first driving circuit 210A and the second driving circuit 210B in FIG. 2A.

The first driver circuit 210A further includes a third buffer 213 and the second driver circuit 210B further includes a fourth buffer 214, as compared to the embodiment of FIG. 4.

The third buffer 213 is configured to receive and buffer the buffered pixel data $P_x$ from the second buffer 212 such that the first pixel format converter 221 performs the conversion based on the raw pixel data $P_0$ to $P_{x-1}$ for the first region 206 received by the first interface INF1 and additionally on the pixel data $P_x$ buffered by the third buffer 213. The fourth buffer 214 is configured to receive and buffer the buffered pixel data $P_{x-1}$ from the first buffer 211 such that the second pixel format converter 222 performs the conversion based on the raw pixel data $P_x$ to $P_{2x-1}$ for the second region 208 received by the second interface INF2 and additionally on the pixel data $P_{x-1}$ buffered by the fourth buffer 214.

The presence of the third buffer 213 and the fourth buffer 214 provides a separate data swap channel for the first driving circuit 210A and the second driving circuit 210B, and thus improves the parallelism of the processing of the first driving circuit 210A and the second driving circuit 210B. The requirements for timing control are further reduced as compared to the embodiment of FIG. 4.

It will be appreciated that the two buffers (buffers 211 and 213, or buffers 212 and 214) in the first driver circuit 210A or the second driving circuit 210B may be implemented with different physical memory spaces of the same buffer chip. Non-limiting examples of the buffers include a static random access memory (SRAM).

In the embodiments described above, the pixel format converters 221 and 222 are assumed to need to borrow only one pixel data in performing the conversion.

However, depending on the SPR arrangement, the pixel format converters 221 and 222 may need to borrow more than one pixel data when performing the conversion. In this case, the first buffer 211 may be configured to buffer more than one data for pixels closest to the boundary 207 in a row of raw pixel data for the first region 206 in response to receipt of the row of raw pixel data, and the second buffer 212 may be configured to buffer more than one data for pixels closest to the boundary 207 in a row of raw pixel data for the second region 208 in response to receipt of the row of raw pixel data.

Depending on the SPR arrangement, it may further be necessary to borrow the pixel data from the adjacent previous row or adjacent next row to complete the pixel format conversion. In this case, the pixel format converters 221 and 222 may perform the conversions on a basis of multiple rows of raw pixel data, and the buffers in the driving circuits 210A and 210B may be configured to buffer the multiple rows of pixel data corresponding to the boundary region.

In addition, in the embodiments described above, the driving circuits 210A and 210B are described as performing conversions from the Real RGB pixel data to the SPR pixel data. However, aspects of the present disclosure are also applicable to other pixel data format conversions in which borrowing of the pixel data for pixels in the vicinity of the boundary between display areas is required.

Variations to the disclosed embodiments can be understood and effected by the skilled person in practicing the claimed subject matter, from a study of the drawings, the disclosure, and the appended claims. In the claims, the word "comprises" or "comprising" does not exclude other elements or steps, and the indefinite article "a" or "an" does not exclude a plurality. The mere fact that certain measures are recited in mutually different dependent claims does not indicate that a combination of these measures cannot be used to advantage.

What is claimed is:

1. A display device comprising:
a display panel comprising a display area having a sub-pixel array subject to, a first sub-pixel arrangement, the display area comprising a first region and a second region arranged side by side in a row direction of the sub-pixel array;
a first driving circuit configured to receive raw pixel data for the first region having a format suitable for a second sub-pixel arrangement and to convert the raw pixel data into converted pixel data having a format suitable for the first sub-pixel arrangement; and
a second driving circuit configured to receive raw pixel data for the second region having a format suitable for the second sub-pixel arrangement and to convert the raw pixel data into converted pixel data having a format suitable for the first sub-pixel arrangement,
wherein the first region and the second region have a boundary therebetween, a boundary region being defined around the boundary, wherein the conversion by the first driving circuit is based on the raw pixel data for the first region and additionally on the pixel data corresponding to the boundary region,
wherein the conversion by the second driving circuit is based on the raw pixel data for the second region and additionally on the pixel data corresponding to the boundary region,
wherein the first driving circuit comprises:
a first interface for receiving the raw pixel data for the first region,
a first buffer configured to buffer a portion of the raw pixel data for the first region that corresponds to the boundary region in response to the first interface receiving the raw pixel data for the first region, and
a first pixel format converter configured to perform the conversion of the raw pixel data for the first region, and
wherein the second driving circuit comprises:
a second interface for receiving the raw pixel data for the second region,
a second buffer configured to buffer a portion of the raw pixel data for the second region that corresponds to the boundary region in response to the second interface receiving the raw pixel data for the second region, and
a second pixel format converter configured to perform the conversion of the raw pixel data for the second region.

2. The display device of claim 1, wherein the first pixel format converter is configured to perform the conversion based on the raw pixel data for the first region received by the first interface and additionally on the portion of data buffered by the first buffer, and wherein the second pixel format converter is configured to perform the conversion based on the raw pixel data for the second region received by the second interface and additionally on the portion of data buffered by the second buffer.

3. The display device of claim 2, wherein the first sub-pixel arrangement is a sub-pixel rendering arrangement, and wherein the second sub-pixel arrangement is a Real RGB arrangement.

4. The display device of claim 1, wherein the first buffer and the second buffer are configured to swap their respective buffered portions of data with each other such that the first pixel format converter and the second pixel format converter perform the conversion based on the respective raw pixel data and additionally on the respective swapped portions of data.

5. The display device of claim 4, wherein the first sub-pixel arrangement is a sub-pixel rendering arrangement, and wherein the second sub-pixel arrangement is a Real RGB arrangement.

6. The display device of claim 1, wherein:
the first driving circuit further comprises a third buffer configured to receive and buffer the buffered portion of data from the second buffer such that the first pixel format converter performs the conversion based on the raw pixel, data for the first region received by the first interface and additionally on the portion of data buffered by the third buffer, and
the second driving circuit further comprises a fourth buffer configured to receive and buffer the buffered portion of data from the first buffer such that the second pixel format converter performs the conversion based on the raw pixel data for the second region received by the second interface and additionally on the portion of data buffered by the fourth buffer.

7. The display device of claim 6, wherein the first sub-pixel arrangement is a sub-pixel rendering arrangement, and wherein the second sub-pixel arrangement is a Real RGB arrangement.

8. The display device of claim 1, wherein the first pixel format converter and the second pixel format converter are configured to perform the conversion on a basis of per raw pixel data row, wherein the first buffer is configured to buffer data for one or more pixels closest to the boundary in a row of raw pixel data for the first region in response to the first interface receiving the row of raw pixel data for the first region, and wherein the second buffer is configured to buffer data for one or more pixels closest to the boundary in a row of raw pixel data for the second region in response to the second interface receiving the row of raw pixel data for the second region.

9. The display device of claim 8, wherein the first sub-pixel arrangement is a sub-pixel rendering arrangement, and wherein the second sub-pixel arrangement is a Real RGB arrangement.

10. The display device of claim 1, wherein the first sub-pixel arrangement is a sub-pixel rendering arrangement, and wherein the second sub-pixel arrangement is a Real RGB arrangement.

11. A method of driving a display panel comprising a display area having a sub-pixel array subject to a first sub-pixel arrangement, the display area comprising a first region and a second region arranged side by side in a row direction of the sub-pixel array, the first region and the second region having a boundary therebetween, a boundary region being defined around the boundary, the method comprising steps of:
receiving, by a first driving circuit and a second driving circuit, raw pixel data for the first region having a format suitable for a second sub-pixel arrangement and raw pixel data for the second region having a format suitable for the second sub-pixel arrangement, respectively;
converting, by the first driving circuit, the raw pixel data for the first region into converted pixel data having a format suitable for the first sub-pixel arrangement, wherein the conversion is based on the raw pixel data for the first region and additionally on the pixel data corresponding to the boundary region; and
converting, by the second driving circuit, the raw pixel data for the second region into converted pixel data having a format suitable for the first subpixel arrangement, wherein the conversion is based on the raw pixel data for the second region and additionally on the pixel data corresponding, to the boundary region,
wherein the step of receiving the raw pixel data comprises:
buffering, by, the first driving circuit, a portion of the raw pixel data for the first region that corresponds to the boundary region in response to reception of the raw pixel data for the first region; and
buffering, by the second driving circuit, a portion of the raw pixel data for the second region that corresponds to the boundary region in response to reception of the raw pixel data for the second region.

12. The method of claim 11, wherein the conversion of the raw pixel data for the first region is based on the raw pixel data for the first region and additionally on the portion of the raw pixel data for the first region that corresponds to the boundary region, and wherein the conversion of the raw pixel data for the second region is based on the raw pixel data for the second region and additionally on the portion of the raw pixel data for the second region that corresponds to the boundary region.

13. The method of claim 11, further comprising prior to the conversions by the first driving circuit and the second driving circuit, swapping the respective buffered portions of data between the first driving circuit and the second driving circuit,
wherein the conversion by the first driving circuit is based on the raw pixel data for the first region and additionally on the swapped portion of the raw pixel data for the second region that corresponds to the boundary region, and
wherein the conversion by the second driving circuit is based on the raw pixel data for the second region and additionally on the swapped portion of the raw pixel data for the first region that corresponds to the boundary region.

14. The method of claim 11, wherein the conversions by the first driving circuit and the second driving circuit are performed on a basis of per raw pixel data row, wherein the buffering by the first driving circuit comprises buffering data for one or more pixels closest to the boundary in a row of raw pixel data for the first region in response to receipt of the row of raw pixel data for the first region, and wherein the buffering by the second driver circuit comprises buffering data for one or more pixels closest to the boundary in a row of raw pixel data for the second region in response to reception of the row of raw pixel data for the second region.

15. The method of claim 11, wherein the first sub-pixel arrangement is a sub-pixel rendering arrangement, and wherein the second, sub-pixel arrangement is a Real RGB arrangement.

16. The method of claim 12, wherein the first sub-pixel arrangement is a sub-pixel rendering arrangement, and wherein the second sub-pixel arrangement is a Real RGB arrangement.

* * * * *